United States Patent [19]

Payne et al.

[11] Patent Number: 4,845,735
[45] Date of Patent: Jul. 4, 1989

[54] NON-INTERFERING METHOD FOR MEASURING PROPAGATION DELAY OF TELECOMMUNICATIONS NETWORK AND APPARATUS FOR ACCOMPLISHING SAME

[75] Inventors: Nicholas W. P. Payne, New Milford; Kiran K. Mistry, Prospect, both of Conn.

[73] Assignee: General DataComm, Inc., Middlebury, Conn.

[21] Appl. No.: 206,514

[22] Filed: Jun. 14, 1988

[51] Int. Cl.⁴ .......................... H04M 1/24; H04B 3/46
[52] U.S. Cl. ............................................. 379/5; 379/24
[58] Field of Search ....................... 379/5, 24; 371/22; 370/15; 324/570 E

[56] References Cited

U.S. PATENT DOCUMENTS 3,899,738  8/1975  Harzer ................................. 379/5

Primary Examiner—Stafford D. Schreyer
Attorney, Agent, or Firm—David P. Gordon

[57] ABSTRACT

Methods and apparatus for measuring propagation delay over a line without interfering with data communications over the line are disclosed. A known signal is sent and looped back over a secondary channel, and the loop time is measured. Because the known signal is sent at a non-interfering frequency at the edge of the passband, the loop time minus fixed delay times of the communicating means does not provide a true measure of propagation delay. Rather, the envelope delay distortion must be determined and also subtracted from the loop time. The envelope delay distortion is determined as a function of the utilized non-interfering frequency and the line length, the latter of which may be estimated from the loop time.

17 Claims, 5 Drawing Sheets

NON-INTERFERING METHOD FOR MEASURING PROPAGATION DELAY OF TELECOMMUNICATIONS NETWORK AND APPARATUS FOR ACCOMPLISHING SAME

BACKGROUND

This invention generally relates to methods and apparatus for measuring the propagation delay of a telecommunications network. More particularly, this invention relates to non-interfering methods and apparatus for measuring propagation delay between communicating devices by using the edge of the data communications passband for sending and receiving signals meant for the measurement of propagation delay.

Data communication between two points theoretically can be conducted at the speed of light. However, due to delays inherent in the communicating devices themselves as well as delays in the intermediate transmitting stations, telecommunications are slowed down. Also, because of the ability of the telephone companies to route communications in many different ways due to local or regional congestion, communication between two points may take a roundabout route. Roundabout routes, however, offer inferior performances compared to more direct routes because of both increased noise and the delay itself. Thus, a good measurement of propagation delay could be beneficial in determining the source of inferior performance.

Presently, techniques for measuring propagation delay of communications between two devices connected by a transmission line require that the data communications on the line be interrupted so that a test of the line can be carried out. Because of the inconvenience of such interruptions, propagation delay is rarely measured.

SUMMARY OF THE INVENTION

It is therefore an object of the invention to provide a method for determining the propagation delay between devices communicating over a transmission line without interrupting the communication.

In accord with the object of the invention, a method for measuring the propagation delay of an unconditioned data communication line is provided and generally comprises:

(a) transmitting a known signal at a non-interrupting frequency over the data communication line from a first communicating means to a second communicating means;

(b) looping the known signal back from the second communicating means to the first communicating means over the secondary channel, and detecting receipt of the known signal;

(c) determining a loop time between the transmitting and receipt at the first communicating means of the known signal;

(d) determining a delay distortion time as a function of the frequency of the known signal and an approximate distance between the first and second communicating means; and (e) determining propagation delay from said determined loop time, delay distortion time, and known fixed delays of the communicating means.

The propagation delay for a particular secondary channel frequency is preferably determined by subtracting a correction factor from the round trip delay (loop time minus known fixed delays). Alternatively, for any given secondary channel frequency, round trip or one way delay distortion may be determined from a look-up table which relates distance ranges to distortion delay relative to a middle frequency. An approximate distance between the communicating means from which a distance range is chosen is obtained from the difference of the measured loop time and the known fixed delays of the communicating means. The propagation delay is then determined by subtracting the known fixed delays and the round trip delay distortion time from the determined loop time, and dividing by two.

A better understanding of the invention, and additional advantages and objects of the invention will become apparent to those skilled in the art upon reference to the detailed description and the accompanying drawings.

DETAILED DESCRIPTION OF THE PREFERRED EMBODIMENT

Figure 1A:
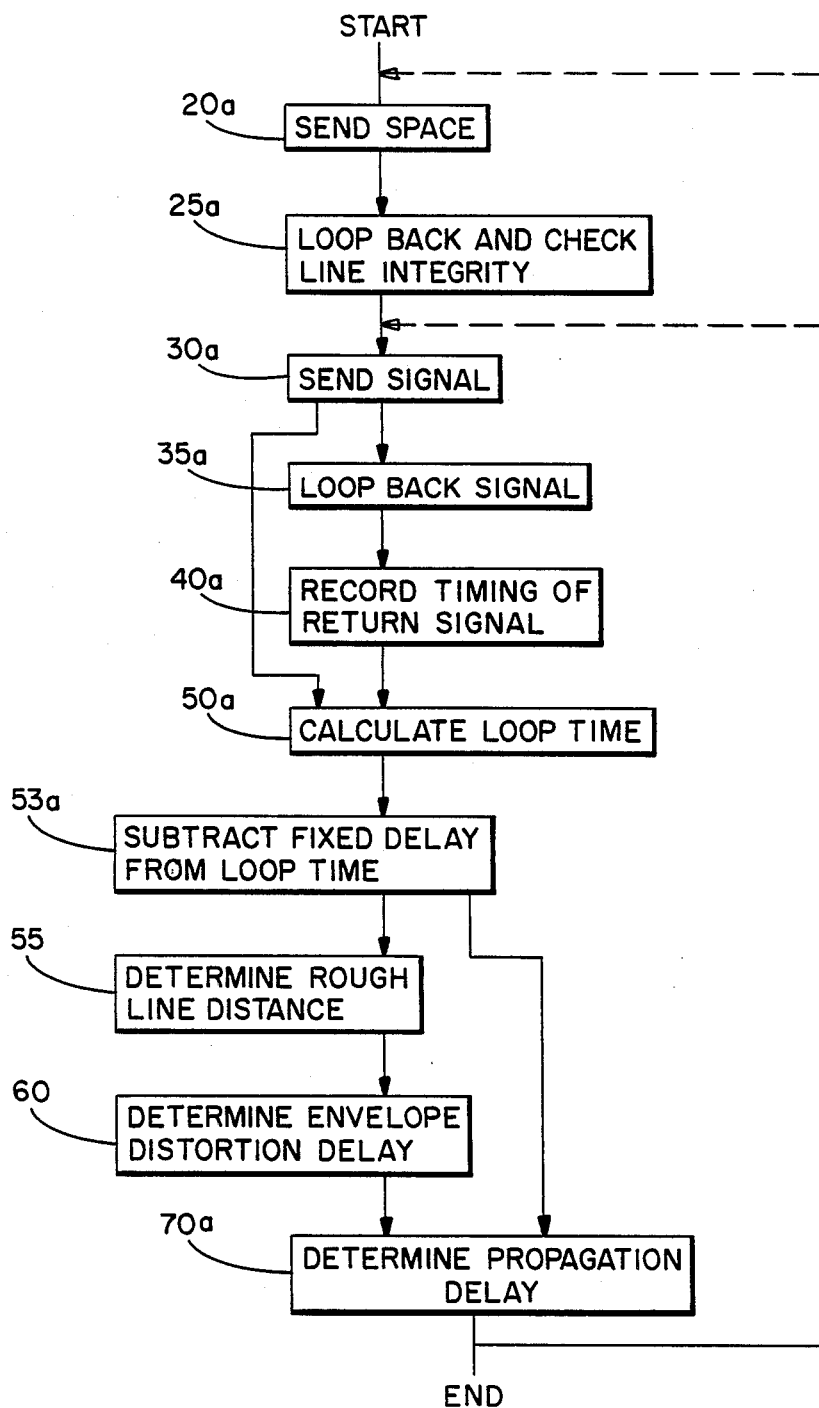
FIGS. 1a and 1b are flow charts of non-interfering methods for determining propagation delay according to the invention.
Figure 2:
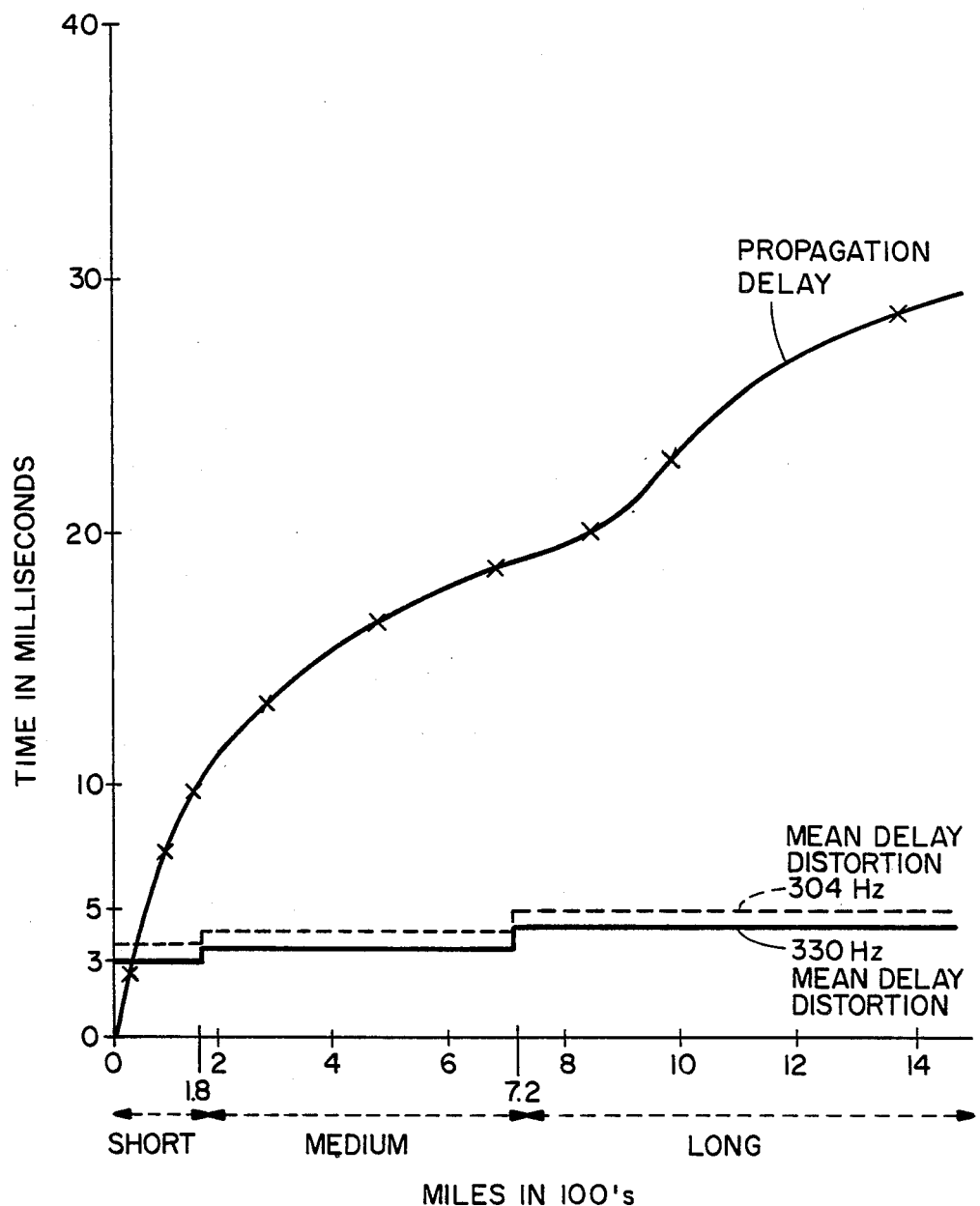
FIG. 2 is graph showing round-trip propagation delay versus distance for a middle frequency, and approximate mean delay distortions versus distance for two out-of-band frequencies.

Turning to FIGS. 1a and 2, a first preferred method for measuring propagation delay of an unconditioned communication line in a non-interfering manner is set forth. As seen at 20a, a source unit transmits over a secondary (diagnostic) channel of a line a known signal (typically a "space" comprised of all zeros or all ones) to a target unit. The target is arranged to loop back at 25a the known signal to the source, thereby establishing the integrity of the loop. At 30a, the source sends a known data pattern signal (e.g. reversals with data changing states at known intervals) over the secondary channel. With the target looping back at 35a the data pattern signal, the source will at 40a be able to receive back the pattern and record the instants in time that the changes in state took place. Knowing the time at which each change in state of the data was transmitted, a determination of the average total signal propagation delay (hereinafter referred to as the "loop time") may be calculated at 50a.

In order to avoid interference between data communications being conducted over the line, the communication of the known data pattern signal is preferably conducted over a secondary channel (i.e. at a frequency at the edge of the passband) of the line. Thus, extra delay is encountered which will not be found in communications occurring over the midband frequencies of the unconditioned line. As is set forth in FIG. 2 which was compiled from information set forth in the End Office Connection Survey Bell System Technical Journal, November 1984 (pages 2078-2087), this extra delay is a function both of the frequency of the secondary channel frequency as well as the distance between the communicating source and target. Thus, as indicated in FIG. 2, for relatively short connections (less than one hundred eighty miles), the mean envelope delay distortion of a 330 Hz signal relative to a middle band frequency of approximately 1700 Hz is approximately 3 milliseconds. For medium connections (180 to 720 miles), the mean envelope delay for the 330 Hz signal is approximately 3.5 milliseconds, while for long connections (>720 miles), the mean envelope delay is approximately 4.5 milliseconds. Of course, for different frequencies, the mean envelope delay relative to the middle band frequency of 1700 Hz will be different. As also indicated in FIG. 2 for a 304 Hz signal, the mean envelope delays for short, medium, and long connections are 3.6, 4.3 and 5.0 milliseconds respectively.

The mean envelope delays set forth in FIG. 2 are shown as step functions depending on the group into which the line distance falls (i.e. short, middle or long). However, if desired, additional groups of distances could be added and more points plotted on FIG. 2. Indeed, a curve of mean envelope delay versus line distance could determined for any particular secondary channel frequency used.

Returning to FIG. 1a, a preliminary determination of line distance must be had before a determination of envelope distortion delay may be determined. Thus, at 53a the known fixed delay of the communicating means is subtracted from the loop time found at 50a. The loop time minus the fixed delays provides a rough estimate of line distance as a rough relationship of loop time to line distance exists. As seen in FIG. 2, for the first 180-200 miles, approximately one millisecond of delay is added for each twenty miles; from 200-720 miles, approximately one millisecond of delay is added for each seventy miles; and after 720 miles, approximately one millisecond of additional loop time is added for every one hundred miles of line distance.

Having initially determined the loop time minus the fixed delay at 53a and the approximate line distance at 55 (through the use of a look-up table or FIG. 2), the envelope delay (or "delay distortion time") is determined at 60 preferably using either a look-up table, or FIG. 2. Then, with the determinations of delay distortion time and loop time minus fixed delay having been made at 60 and 53a respectively, a determination of propagation delay may be had at 70a. Preferably, the propagation delay is determined by subtracting the round trip delay distortion time determined at 60 from the difference of the loop time and fixed delays determined at 53a.

Figure 1B:
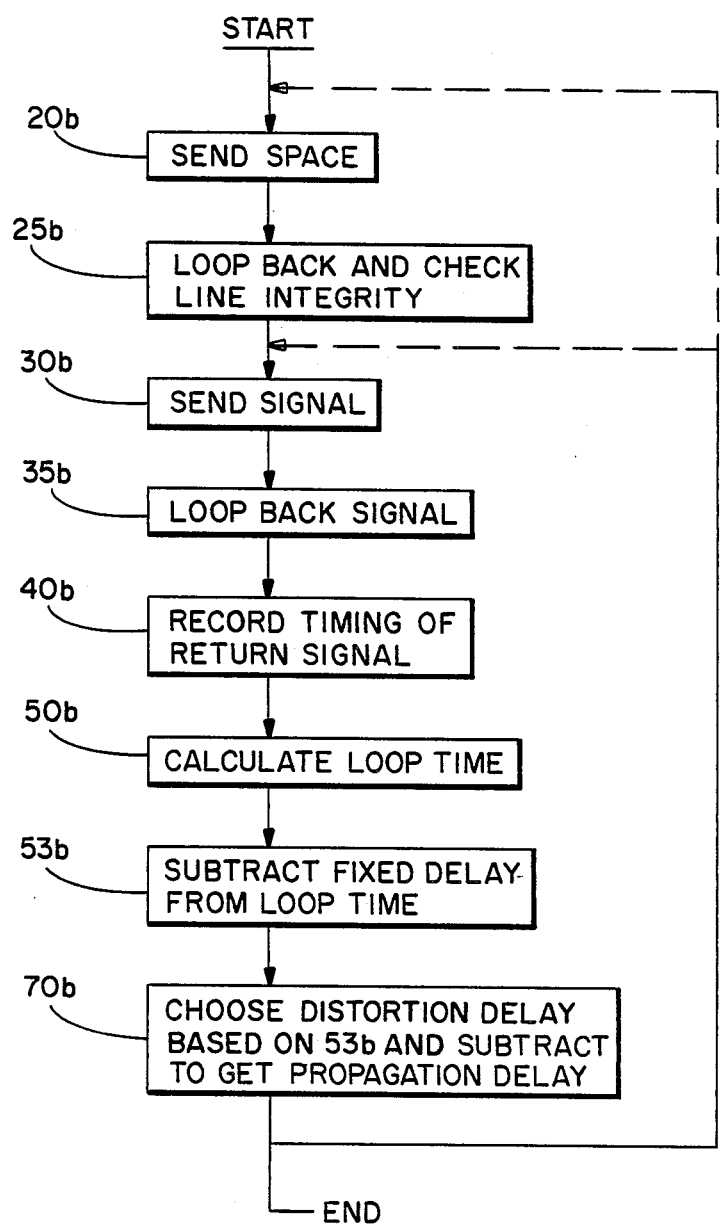

Turning to FIG. 1b, an altenative preferred manner of practicing the method invention is seen. Steps 20b, 25b, 30b, 35b, 40b, 50b and 53b all correspond to the previously described steps 20a, 25a, 30a, 35a, 40a, 50a, and 53b such that at 53b, a determination of the loop time minus the fixed delays is made. However, instead of using the loop time minus the fixed delays to provide a preliminary indication of distance, and then using the distance and secondary channel frequency to provide a determination of delay distortion according to a look-up table as set forth in FIG. 1a, the propagation delay is determined directly in FIG. 1b at step 70b. The propagation delay is found by taking the loop time minus the fixed delays of the communicating means, and depending upon the value, choosing and subtracting a round trip delay distortion value. Thus, at 330 Hz and for measured loop times minus fixed delays of zero to sixteen milliseconds, a delay distortion of six milliseconds is chosen and subtracted from the adjusted loop time to provide the determined propagation delay (which is not less than zero). For measured loop times minus fixed delays of seventeen to twenty-six milliseconds, a delay distortion of seven milliseconds is chosen and subtracted to provide the propagation delay. Finally, for measured loop times minus fixed delays of twenty seven milliseconds or greater, nine milliseconds is chosen at the delay distortion and is subtracted to provide the propagation delay.

As indicated in FIGS. 1a and 1b, if desired, the propagation delay of a line may be monitored over time by repeating the method steps set forth in FIGS. 1a or 1b. Of course, if a line is continually in use, steps 20 and 25 need not be repeated. The repetition of the propagation delay measurement would provide the user with an indication as to whether a communication is being rerouted during transmission.

Figure 3A:
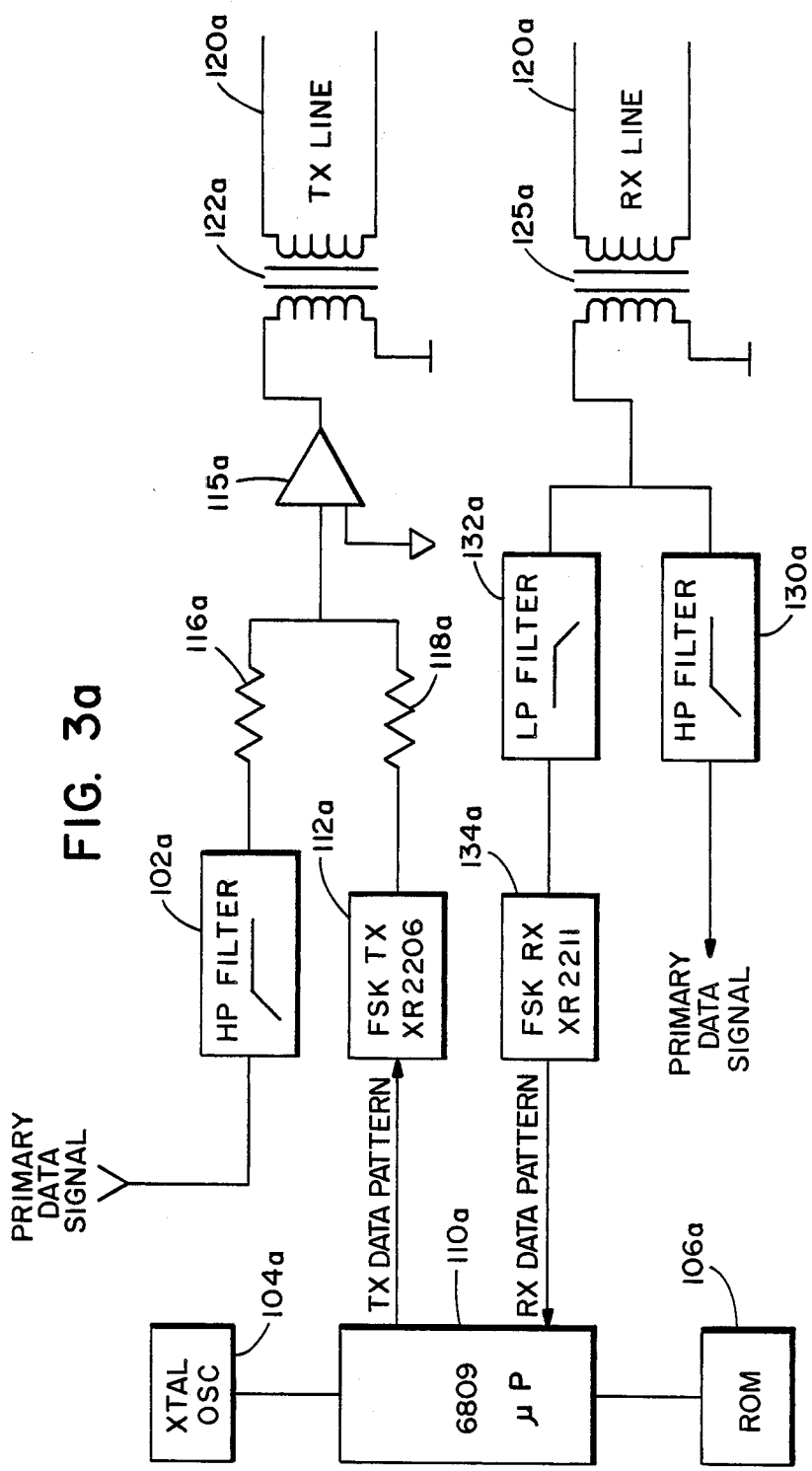
FIGS. 3a and 3b are block diagrams of the sending and receiving means for determining propagation delay.
Figure 3B:
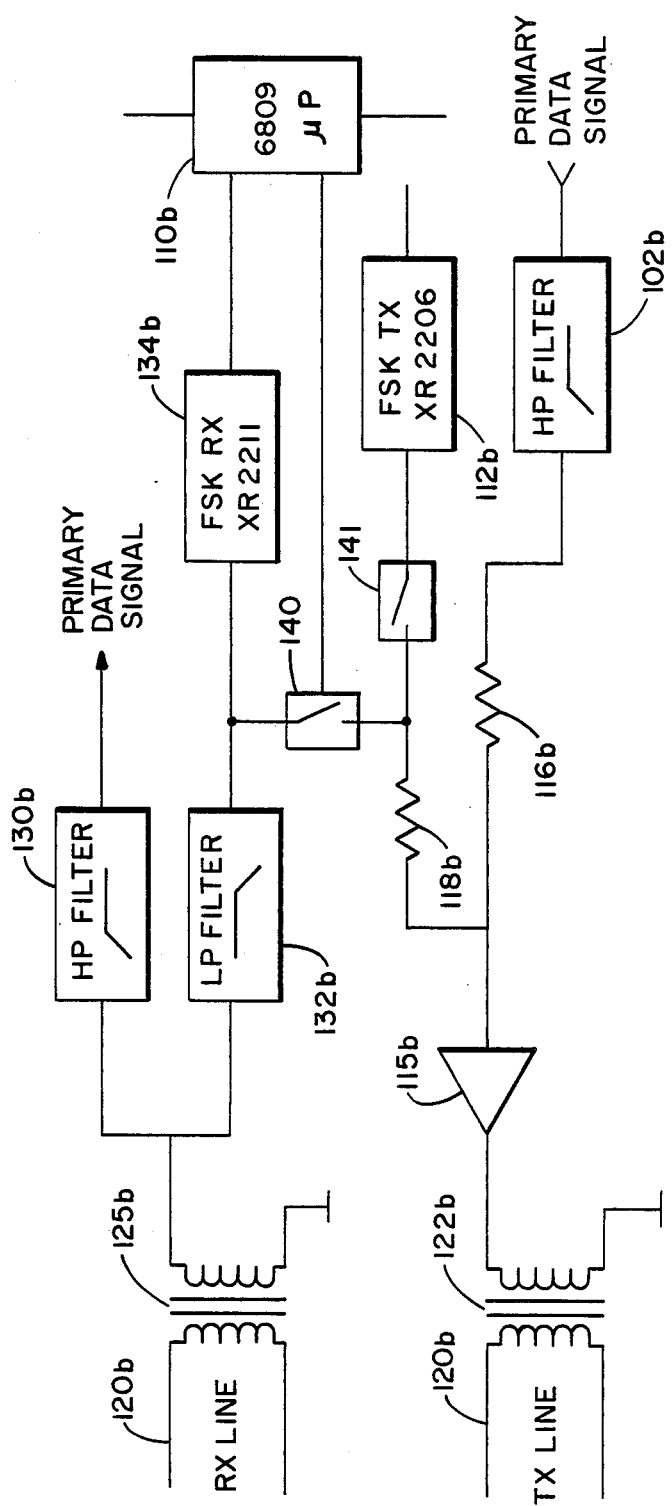

Turning to FIGS. 3a and 3b where like numerals are indicative of like parts, the means for conducting the steps of FIGS. 1a and 1b are broadly shown and basically comprise front ends 100a and 100b to modems (not shown). While front ends 100a and 100b are not identical as shown, those skilled in the art will appreciate that it might be beneficial for all modems to incorporate the features of both the master and slave modems. On the sending end, primary data which has been modulated by a modem is high pass filtered at 102a to clear the sidebands which would fall into the 300-400 Hz range of the secondary channel. A microprocessor 110a such as a Motorola 6809, having an associated timing source 104a and ROM 106a is provided and arranged to send data patterns (signals) as discussed with reference to FIGS. 1a and 1b. The data signals are then converted to FSK signals at the desired frequencies by an FSK signal generator 112a such as an XR2206 manufactured by Exar Corp. The primary data signal and the secondary FSK data signal are summed by a summing amplifier 115a and resistors 116a and 118a. The resultant composite signal is then transmitted over the data communication line 120a via transformer 122a.

The front end 100b of the looping modem receives the composite transmitted signal at transformer 125b. The composite transmitted signal is then split. One path is high pass filtered at 130b to provide the primary data signals, and the other path is low pass filtered at 132b to provide the secondary data signal. The FSK secondary data signal is then demodulated via a phase locked loop circuit 134b such as an XR2211 manufactured by Exar Corp. The resultant digital data is then received by microprocessor 110b. If the signal is to be looped back, and the microprocessor 110b has been previously informed of the same, microprocessor 110b will have set loopback switch 140 (together with gain adjustment as required) to accomplish the same, and will have set switch 141 to cut off any secondary signals being received from the FSK transmit 112b. Thus, the secondary signals originally forwarded from modem front end 100a will be looped back via resistor 118b, and summed by summing amplifier 115b together with primary signals which have been high pass filtered at 102b to filter out sidebands which would fall in the secondary channel frequency range. The composite signal is then transmitted via transformer 112b, and line 120b back to the front end 100a of the transmitting modem. At 100a, the composite primary and secondary signal is received by transformer 125a and again split. One path is high pass filtered at 130a to provide the primary signal while the other is low pass filtered at 132a to provide the secondary channel signal which is demodulated by the phase lock loop 134a and sent to microprocessor 110a. If the low frequency signals are for the purpose of measuring propagation delay, the receipt of the signal stops a counter in microprocessor 110a, which, with the help of oscillator 104a, had been timing the loop time between the sending and receipt of the same. The microprocessor 110a, with the use of ROM 106a which preferably stores at least look-up tables regarding delay distortion time, may then conduct the necessary calculations for a determination of propagation delay.

There has been described and illustrated herein methods and apparatus for measuring the propagation delay of an unconditioned data communication line. While particular embodiments have been described, it is not intended that the invention be limited thereby as it is intended that the invention be broad in scope and that the specification be read likewise. Thus, for example, while certain orders were set forth for subtracting fixed delays from loop times, and then determining and subtracting distortion delays, those skilled in the art will appreciate that the order of subtraction is for convenience, and is not necessarily required to practice the broad invention. Indeed, some in the art, knowing their fixed delays, may wish a determination of the propagation plus fixed delay. Also, while a non-interfering average frequency of 330 Hz was chosen as the preferred frequency for conducting the measurement, it will be appreciated that other frequencies could be chosen, provided the delay distortion time is taken into account for the chosen frequency when making the propagation delay determination. Further, the choice of means for finding the delay distortion times could vary from look-up charts or tables, to dedicated circuitry depending on the loop time or loop time minus fixed communication means delays, to graphs, and to other available means in the art. Likewise, the provided circuitry for conducting the propagation delay measurement could easily be changed to various equivalents as would be known to those skilled in the art.

It will further be appreciated by those skilled in the art, that while the invention was described with regard to frequency division multiplexed (FDM) apparatus, the invention could be applied to time division multiplexed (TDM) apparatus. With TDM apparatus, because the known signal which is to be looped back is transmitted at the same frequency as the rest of the (primary) data, it is not necessary to determine delay distortion time in order to determine the propagation delay. Thus, the use of secondary channel(s) with TDM apparatus permits the primary data to proceed unimpeded, provided, of course, enough bandwidth is available to accommodate both the primary data channels and the secondary channel used for the propagation delay measurement. Therefore, it will be apparent to those skilled in the art that additional modifications can be made to the described invention without deviating from the scope of the invention as so claimed.

We claim:

1. A method for measuring the propagation delay of a data communication line connecting a first and second communicating means, comprising:
    (a) transmitting a known signal at a non-interfering frequency over said data communication line from said first communicating means to said second communicating means;
    (b) looping said known signal back from said second communicating means to said first communicating means, and detecting receipt of said known signal;
    (c) determining loop time between said transmitting and said receipt at said first communicating means of said known signal;
    (d) finding a delay distortion time for said communication line; and
    (e) determining propagation delay from said determined loop time and said delay distortion time.

2. A method for measuring propagation delay according to claim 1, wherein:
    said communicating means have known fixed delays, and
    said propagation delay is further determined from said known fixed delays.

3. A method for measuring propagation delay according to claim 2, wherein:
    said delay distortion time is found based on the difference of said determined loop time and said known fixed delays.

4. A method for measuring propagation delay according to claim 3, wherein:
    said non-interfering frequency is approximately 330 Hz, and said delay distortion time is found to be
    three milliseconds for each direction of said line where said difference of determined loop time and known fixed delays is between approximately zero and sixteen milliseconds,
    three and a half milliseconds for each direction of said line where said difference of determined loop time and known fixed delays is between approximately seventeen and twenty-six milliseconds,
    four and a half milliseconds for each direction of said line where said difference of determined loop time and known fixed delays is greater than approximately twenty-seven milliseconds.

5. A method for measuring propagation delay according to claim 3, wherein:
    said delay distortion time is found as a function of said non-interfering frequency fo said known signal, a middle frequency of a primary channel of said line, and an approximate distance between said first and second communicating means.

6. A method for measuring propagation delay according to claim 2, wherein:
    said delay distortion time is found as a function of said non-interfering frequency of said known signal, a middle frequency of a spectrum at which primary data is transmitted over said line, and an approximate distance between said first and second communicating means.

7. A method for measuriong propagation delay according to claim 6, wherein:
    said approximate distance is determined from said determined loop time and said known fixed delays.

8. A method for measuring propagation delay according to claim 7, wherein:
    said known frequency is approximately 330 Hz, said middle frequency is approximately 1700 Hz, and said delay distortion time is chosen to be three milliseconds for short line distances, three and a half milliseconds for middle line distances, and four and a half milliseconds for long line distances.

9. A method for measuring propagation delay according to claim 8, wherein:
    said short line distances include distances of up to approximately one hundred eighty miles, said middle line distances include distances of between approximately one hundred eighty miles to approximately seven hundred twenty miles, and said long line distances include distances greater than approximately seven hundred twenty miles.

10. A method for measuring propagation delay according to claim 9, wherein:
said propagation delay is determined by subtracting said known fixed delays and twice the one way delay distortion time from the determined loop time, and dividing by two.

11. Apparatus for measuring the propagation delay of a data communication line connecting a first and a second communicating means, said second communicating means having the capability of looping data received over said data communication line from said first communicating means back to said first communicating means, said apparatus comprising:
  (a) means for generating and transmitting a known signal at a frequency not interfering with a primary data frequency spectrum over said data communication line from said first communicating means to said second communicating means;
  (b) means for detecting receipt of said known signal which was looped back by said second communicating means to said first communicating means;
  (c) clocking means coupled to said means for detecting and to said means for generating and transmitting, for timing said transmission of said known signal and said receipt of said known signal and for determining a loop time between said transmitting and said receipt at said first communicating means of said known signal;
  (d) means coupled to said clocking means for finding a delay distortion time for said communication line based on at least said determined loop time; and
  (e) processing means for determining propagation delay from said determined loop time and said delay distortion time.

12. An apparatus for measuring propagation delay according to claim 11, further comprising:
  (f) memory means for storing known fixed delays of said first and second communicating means, said fixed delay of said first communicating means being the delay between the generation and transmission onto said communication line of said known signal, and said fixed delay of said second communicating means being the delay between the receipt of said known signal from said communication line until detection by detecting means of said second communicating means, wherein
  said processing means further determines propagation delay from said known fixed delays.

13. An apparatus for measuring propagation delay according to claim 12, wherein:
said delay distortion time is found by said means coupled to said clocking means based on the difference of said loop time determined by said clocking means and said known fixed delays stored by said memory means.

14. An apparatus for measuring propagation delay according to claim 13, wherein:
said frequency not interfering with said primary data frequency is approximately 330 Hz;

times for said delay distortion time are stored in said memory means; wherein
said processing means chooses among said stored times such that said delay distortion time for said data communication line is
three milliseconds for each direction of said line where said difference of determined loop time and known fixed delays is between approximately zero and sixteen milliseconds,
three and a half milliseconds for each direction of said line where said difference of determined loop time and known fixed delays is between approximately seventeen and twenty-six milliseconds,
four and a half milliseconds for each direction of said line where said difference of determined loop time and known fixed delays is greater than approximately twenty-seven milliseconds.

15. An apparatus for measuring propagation delay according to claim 13, wherein:
said delay distortion time is found as a function of said non-interfering frequency of said known signal, a middle frequency of a primary channel of said line, and an approximate distance between said first and second communicating means.

16. An apparatus for measuring propagation delay according to claim 12, wherein:
said means coupled to said clocking means for determining delay distortion time finds said delay distortion time as a function of said non-interfering frequency of said known signal, a middle frequency of a frequency specturm at which primary data is communicated over said line, and an approximate distance between said first and second communicating means.

17. A method for measuring propagation delay of a data communication line connecting a first and second communicating means, comprising:
  (a) generating a known signal for transmission over said data communication line from said first communicating means to said second communicating means;
  (b) time division multiplexing said known signal with at least data from a primary data channel;
  (c) receiving and demultiplexing said multiplexed signal and data at said second communicating means, remultiplexing said known signal with primary channel data for transmission to said first communicating means, and transmitting said multiplexed data including said known signal to said first communicating means;
  (d) demultiplexing said multiplexed data including said known signal at said first communi cating means and determining a loop time between said transmitting and said receipt at said first communicating means of said known signal; and
  (e) determining propagation delay from said determined loop time and from known fixed delays of said communicating means.

* * * * *